UNITED STATES PATENT OFFICE.

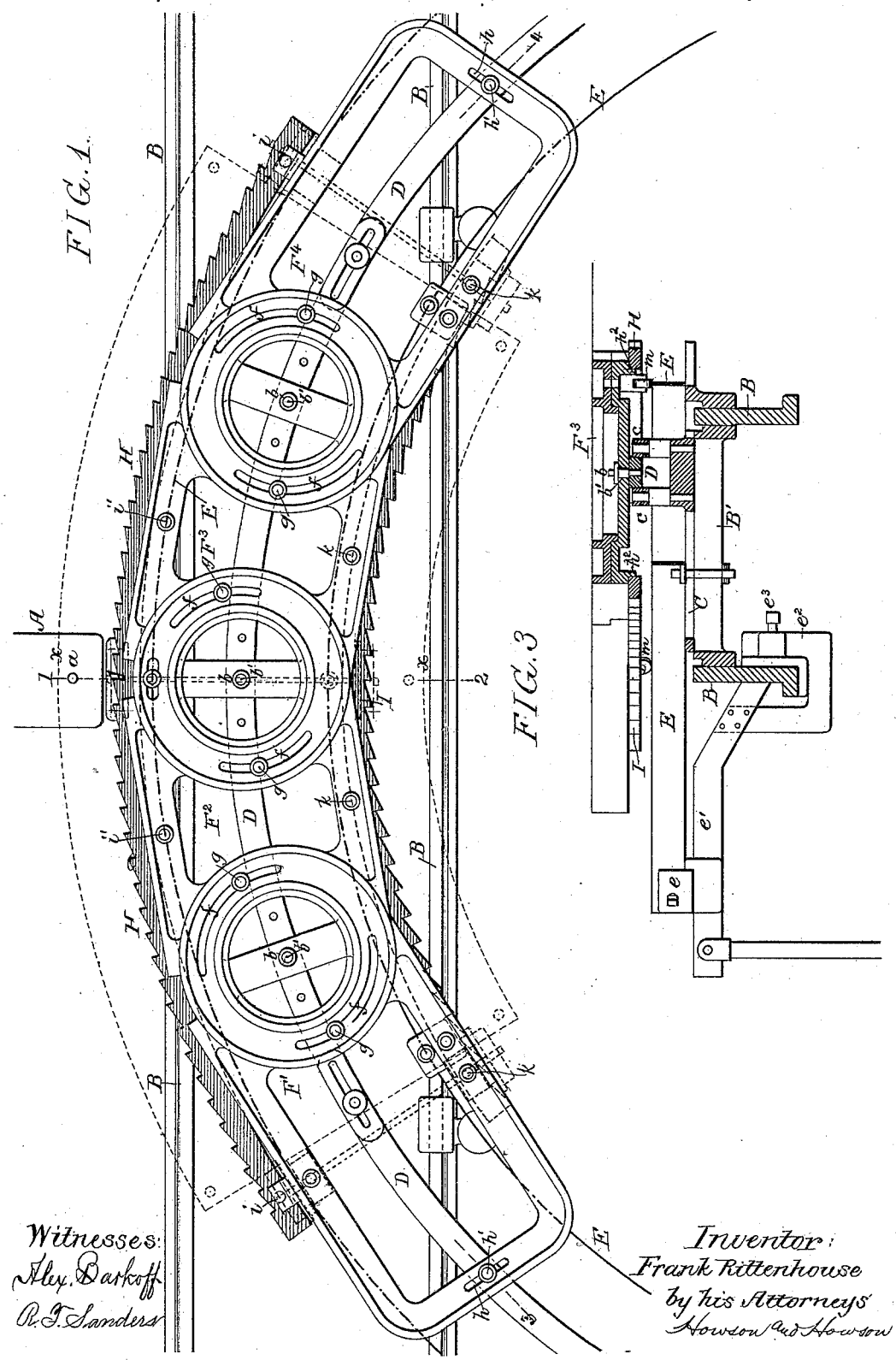

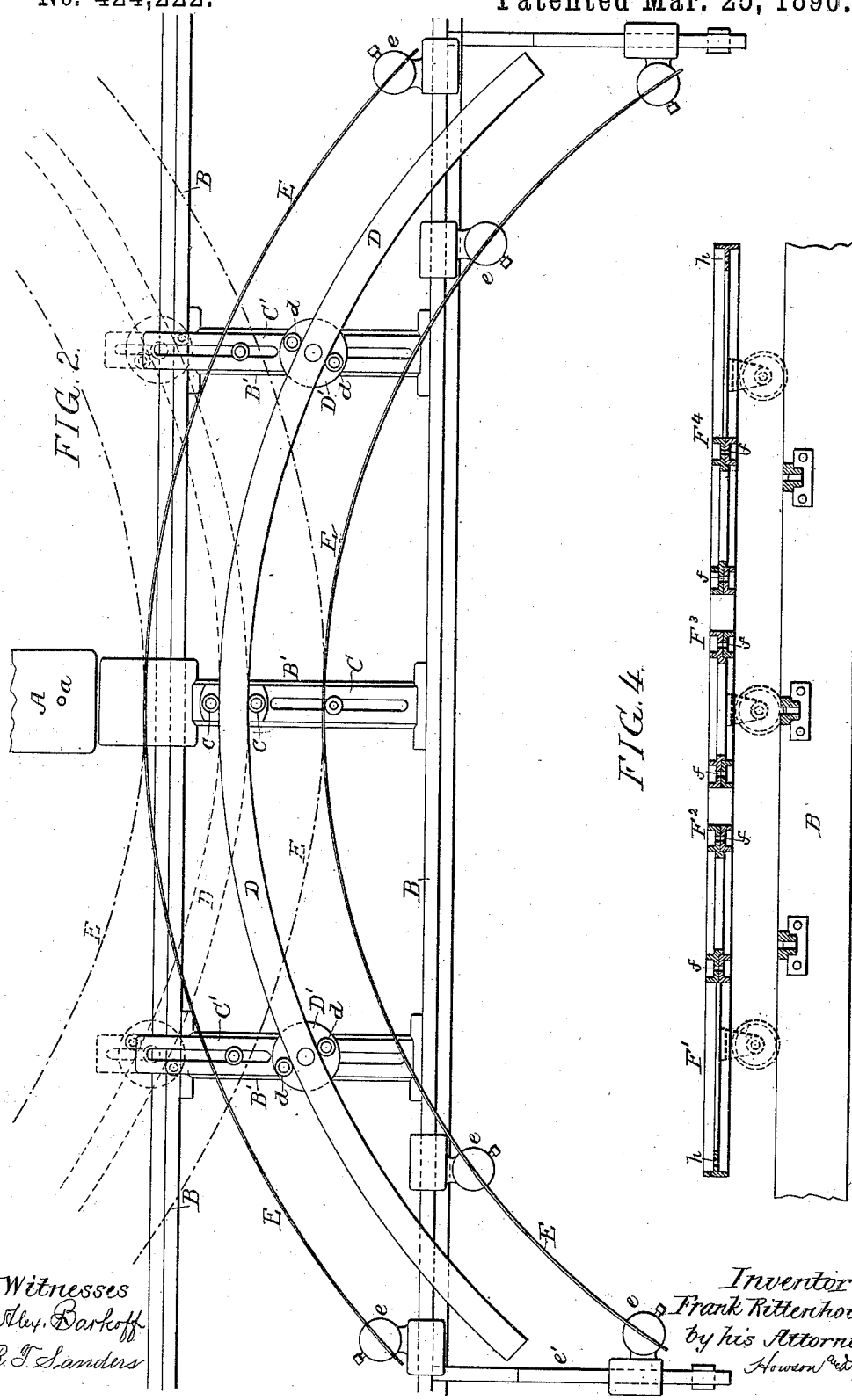

FRANK RITTENHOUSE, OF NORRISTOWN, PENNSYLVANIA.

MACHINE FOR PUNCHING AND SHEARING CURVED PLATES.

SPECIFICATION forming part of Letters Patent No. 424,222, dated March 25, 1890.

Application filed August 22, 1889. Serial No. 321,595. (No model.)

*To all whom it may concern:*

Be it known that I, FRANK RITTENHOUSE, a citizen of the United States, and a resident of Norristown, Montgomery county, Pennsylvania, have invented certain Improvements in Machines for Punching and Shearing Curved Plates, of which the following is a specification.

The object of my invention is to construct an adjustable guide-table for punching and shearing machines by which curved plates for use in boiler and tank making and in constructing sheet-metal structures can be punched or cut, as fully described hereinafter.

In the accompanying drawings, Figure 1 is a plan view of my improved machine, showing the plate in dotted lines, the plate in this instance being a section of a tapered cylinder. Fig. 2 is a plan view with the carriage removed. Fig. 3 is a section on the line 1 2, Fig. 1; and Fig. 4 is a section on the line 3 4, Fig. 1.

I have shown in the drawings the table used in connection with a punching-machine; but it will be evident that the table can be used in front of shears as well without departing from my invention.

A represents a punching-machine of ordinary construction, $a$ being the center of the punch.

B B are ways or rails on which the plate-carriage is mounted directly in front of the punching-machine A when a straight plate is to be punched. Adapted to cross-bars B' on the ways B are slides C C', the slide C being centrally situated in respect to the punch and having two guide pins or rollers $c\ c$. Adapted to fit between these guide pins or rollers is a curved rail D. This rail is the templet and is of the curve to which the carriage is set to punch the holes in the plate. Curves of different radius and shape are represented by different templet-rails, depending altogether upon the radius of the edges of the plate to be punched.

On the slides C' C' are pivoted blocks D, having pins or rollers $d\ d$, between which passes the rail D, so that when the rail is placed upon the machine these slides are loose and can be adjusted so that the rail will be guided in its travel by the rollers $c\ c$ and the rollers $d\ d$ of the slides C' C', as will be readily understood on reference to the drawings, Fig. 2.

E E are the rails on which the carriage is supported, these rails being clamped to brackets $e\ e$ on the stationary frame of the machine, although in some cases, as shown in the drawings, the outer supports $e'$ are in the form of brackets having clamps $e^2$ and a set-screw $e^3$, by which they are secured to the rails B B of the bed, as shown in Fig. 3, so that they can be readily removed from the machine when straight plates are to be punched.

The carriage in the present instance is made in four sections $F'\ F^2\ F^3\ F^4$. The abutting ends of each of these sections are semicircular in form, one section fitting over the adjoining section, as shown in Fig. 4. Each of these sections has a segmental groove $f$, and adapted to these grooves are bolts $g$, as shown in Fig. 1, which clamp the sections in proper position.

In the center of each circular end of the sections $F'\ F^2\ F^3\ F^4$ is an orifice $b$, through which passes a bolt $b'$ into an orifice in the rail D, as shown in Figs. 1 and 3, thus justifying the carriage F in respect to the curvature of the rail D. The outer ends of the end sections F' and $F^4$ are slotted at $h\ h$, and through each of these slots passes a bolt $h'$, which is adapted to an orifice in the rail D. After the bolts $h'\ h'$ have secured the table in proper position the clamp-bolts $g\ g$ clamp the sections together, thus forming a rigid structure. Thus it will be seen that the carriage F can be adapted to any form of guide-rail D.

On the outer edge of the carriage is a concaved rack H, having ratchet-teeth, as shown, and this rack is clamped to brackets $i\ i$ on the end sections F' and $F^4$ of the carriage and is secured to the intermediate sections $F^2$ and $F^3$ by bolts $i'$. The lower ring $h^2$ of each section of table extends below the frame and back of the rack and is turned off true with the pivot-bolt, so as to form a back support for the rack. This rack is rigidly secured to the carriage after the carriage has been set to the rail D. The usual feed mechanism employed for straight feed-tables can be used upon this circular carriage, the feed-pawls acting upon the racks at the point $j$. The rack can have teeth spaced differently to correspond with the number of holes required to be punched in the plate and can be removed and replaced or a new rack readily substituted therefor.

On the inner edge of the carriage is a convex rack I, clamped at $k$ to the different sections of the carriage F. This rack has teeth the distance apart of which is the same as the holes to be punched in the inner or convex side of the plate, although it is not necessary in constructing a machine of this character to have both racks; but for convenience of manipulation the carriage is provided with both racks, so as to readily punch holes on either side of the plate without removing the plate or setting the carriage.

In the machine shown in the drawings the center line of the rail D is midway between the edges $x\ x$ of the plate, so that after the concave side of the plate has been punched the carriage is raised by any suitable mechanism and the rails E E moved to the position shown by dotted lines in Fig. 2, the slides C′ C′ being moved to the position shown by dotted lines in said figure, and the position of the carriage is reversed, so that the convex edge of the plate will be in line with the punch. The mechanism can then be set in motion, and the feed mechanism, instead of acting on the concave rack, will act upon the convex rack, as will be readily understood.

Any suitable guide-rollers $m$ may be mounted on the under side of the carriage F and travel upon the rails E E, and removable rollers (shown by dotted lines in Fig. 4) may be secured to the table to run on the rails B B when the table is used for straight work.

I claim as my invention—

1. In a machine for punching curved plates, the combination of the base having guides and a templet-rail adapted to said guides, with a sectional carriage adapted to be mounted upon said rail and adjusted in respect thereto, substantially as described.

2. The combination of the templet-rail adapted to guides on the frame of the machine and an adjustable sectional carriage adapted to said rail, with a detachable rack adapted to be secured to said carriage and ratchet mechanism adapted to operate upon the rack and move the table, substantially as described.

3. The combination of the frame of the machine, adjustable guides thereon, and a templet-rail adapted to said guides, with an adjustable sectional carriage adapted to be secured to said rail and convex and concave racks secured to said carriage, substantially as described.

4. The combination of the bed-frame of the machine, slides thereon, and guide-blocks on said slides, with a templet-rail adapted to said guide-blocks, an adjustable carriage made up of a series of sections, with an orifice in each of said sections, and pins adapted to pass through said orifices into the templet-rail, substantially as described.

5. The combination of the templet-rail and guides therefor, with an adjustable carriage made up of a series of sections, each of said sections having circular ends, orifices in each of said circular ends, pins adapted to pass through said orifices into the templet-rail, and segmental slots in said sections, and bolts adapted to said slots for securing the sections together, substantially as described.

6. The combination of the bed-plate, guides thereon, a templet-rail adapted to said guides, and a sectional carriage secured to said templet-rail, with carrying-rails E E, adjustably secured to said base-frame, substantially as described.

7. The combination of the base-frame of the machine, the guides thereon, the templet-rail adapted to said guides, and a carriage secured to said templet-rail, with removable brackets clamped to said base-frame and supporting-rails adjustably secured to said base-frame and bracket, substantially as described.

8. The combination of the templet-rail adapted to guides on the frame of the machine and an adjustable sectional carriage adapted to said rail, with a detachable rack adapted to be secured to said carriage, with lips or rings $h^2$ on the carriage to support the rack, and ratchet mechanism adapted to operate upon the rack and move the table, substantially as described.

In testimony whereof I have signed my name to this specification in the presence of two subscribing witnesses.

FRANK RITTENHOUSE.

Witnesses:
 JNO. E. PARKER,
 WILLIAM D. CONNER.